United States Patent
Nakazawa et al.

(10) Patent No.: US 7,410,255 B2
(45) Date of Patent: Aug. 12, 2008

(54) MICRODISPLAY

(75) Inventors: Yasuhiro Nakazawa, Niigata (JP); Takeshi Yawata, Niigata (JP); Takeshi Suzuki, Niigata (JP)

(73) Assignee: Arisawa Mfg. Co., Ltd., Niigata (JP)

( * ) Notice: Subject to any disclaimer, the term of this patent is extended or adjusted under 35 U.S.C. 154(b) by 0 days.

(21) Appl. No.: 11/686,361

(22) Filed: Mar. 15, 2007

(65) Prior Publication Data

US 2007/0217016 A1    Sep. 20, 2007

(30) Foreign Application Priority Data

Mar. 16, 2006   (JP)   ............... 2006-073524

(51) Int. Cl.
*G02C 1/00* (2006.01)
*G02B 27/14* (2006.01)
*G02G 5/00* (2006.01)

(52) U.S. Cl. ............... 351/158; 359/630; 345/8

(58) Field of Classification Search ............. 351/158, 351/41, 59, 60, 57; 359/630, 637, 638, 639, 359/640; 345/7, 8, 9
See application file for complete search history.

(56) References Cited

U.S. PATENT DOCUMENTS 6,034,653 A * 3/2000 Robertson et al. ............ 345/8
6,222,677 B1 * 4/2001 Budd et al. ................ 359/630

FOREIGN PATENT DOCUMENTS

JP    2003-295128    10/2003

* cited by examiner

*Primary Examiner*—Hung X Dang
(74) *Attorney, Agent, or Firm*—Jianq Chyun IP Office

(57) ABSTRACT

A microdisplay attached to either lens of spectacles includes: a display body; a vertical extending section attached to approximately the center of the display body in the horizontal direction that extend to in the vertical direction; and a horizontal extending section of which one end is connected to a nose bridge of the spectacles and the other end is connected to end pieces of the spectacles that slidably holds the vertical extending section in the horizontal direction.

4 Claims, 7 Drawing Sheets

MICRODISPLAY

CROSS REFERENCE TO RELATED APPLICATION

The present application claims priority from a Japanese Patent Application(s) No. 2006-073524 filed on Mar. 16, 2006, the contents of which are incorporated herein by reference.

BACKGROUND

1. Field of the Invention

The present invention relates to a connector and an image forming apparatus. Particularly, the present invention relates to a connector used for attaching a microdisplay to a pair of glasses, and an image forming apparatus using the microdisplay.

2. Related Art

FIG. 6 is a perspective view showing a known microdisplay 10 attached to spectacles 500. FIG. 7 is a perspective view showing the spectacles 500 used with the microdisplay 10. As shown in FIG. 6, the microdisplay 10 generates an image and displays the same to the user wearing the spectacles 500. The microdisplay 10 includes an image information generating section 30 that generates information on the image and a display body 40 that displays the image information generated by the image information generating section 30.

The image information generating section 30 has a generating section body 32 and a cable 34 that connects electrically between the generating section body 32 and the display body 40. The generating section body 32 reads out the image stored in a storage medium to generate the image information, and sends the same to the display body 40 via the cable 34.

The display body 40 has a display section 42 and main body 44. The display body 42 has, for example, a 1-inch liquid crystal panel and a lens to display the image information sent from the generating section body 32. A fixture 52 is fixed to the outside of the main body 44, and an edge 54 of the fixture 52 protrudes from the side of the main body 44. The edge 54 includes a screw section 56 having a threaded hole penetrating the upper surface and the bottom surface thereof in the vertical direction. A vertical position adjusting screw 62 is screwed into the threaded hole, and one end thereof is connected to the sliding member 64 with an arm 66. The sliding member 64 has a through-hole penetrating between the pair of the opposite surfaces. A horizontal extending section 70 is disposed through the through-hole of the sliding member 64 to slidably hold the sliding member 64. Magnets 82 and 84 are provided on both ends of the horizontal extending section 70.

As shown in FIG. 7, the spectacles 500 includes a nose bridge 510, rims 521 and 523, lenses 531 and 533, end pieces 541 and 543, hinges 551 and 553, and temples 561 and 563. Magnetic surfaces 571 and 573 are formed on both sides of the upper surface of the nose bridge 510. Additionally, magnetic surcaces 575 and 577 are formed on the upper surface of the end pieces 541 and 543.

The microdisplay 10 is attached to either the lens 531 or the lens 533 of the spectacles 500. As shown in FIG. 6, when the microdisplay 10 is attached to the lens 531 side, the magnet 82 on one end of the horizontal extending section 70 is abutted with the magnetic surface 571 formed on the upper surface of the nose bridge 510 on the lens 531 side of the spectacles 500 and adhered to the same by magnetic force. Meanwhile, the magnet 24 on the other end of the horizontal extending section 70 is abutted with the magnetic surface 575 formed on the upper surface of the end piece 541 of the spectacles 500 and adhered to the same by magnetic force. Therefore, the horizontal extending section 70 is put over the upper portion of the lens 531 while the microdisplay 10 connected to the sliding member 64 through which the horizontal extending section 70 penetrates via the vertical position adjusting screw 62 and the fixture 52 is disposed at the outside of the lens 531. At this time, the surface of the display section 42 on which image information is shown is faced to the lens 531, so that the user wearing the spectacles 500 can view the image information displayed on the display section 42 through the lens 531.

Meanwhile, when the microdisplay 10 is attached to the lens 533 side, the magnet 82 on one end of the horizontal extending section 70 is abutted with the magnetic surface 573 formed on the upper surface of the nose bridge 510 on the lens 533 side of the spectacles 500 and adhered to the same by magnetic force. Then, the magnet 84 on the other end of the horizontal extending section 70 is abutted with the magnetic surface 577 formed on the upper surface of the end piece 543 of the spectacles 500 and adhered to the same by magnetic force. While the display body 40 is attached to the lens 531 or the lens 533, it can be moved to a desired position on the lens 531 or the lens 533 in the horizontal direction by moving the sliding member 64 on the horizontal extending section 70 in substantially the horizontal direction. The display body 40 also can be moved to a desired position on the lens 531 or the lens 533 in the vertical direction by adjusting the position of the screw section 56 on the vertical position adjusting screw 62.

In the microdisplay 10 described above, as shown in FIG. 6, the display body 40 has the edge 54 of the fixture 52, the screw section 56, and the vertical position adjusting screw 62 on the lateral side thereof. Therefore, especially if the user puts the display body 40 on either the lens 531 or the lens 533 on the nose bridge 510 side, which is near the center of the spectacles 500, the user will be unsighted by the edge 54 of the fixture 52, the screw section 56, and the vertical position adjusting screw 62 when the user looks away from the image information displayed on the display section 42. In addition, the display body 40 attached to either the lens 531 or the lens 533 cannot be moved in the vertical direction. Therefore, if the display body 40 is moved in the vertical direction, firstly the display body 40 is removed from the spectacles 500, and then the position of the screw section 56 on the vertical position adjusting screw 62 has to be adjusted. Moreover, if the display body 40 attached to either the lens 531 or the lens 533 is moved temporarily to the position outside of the user's view, the horizontal extending section 70 and the vertical position adjusting screw 62 as well as the display body 40 must have been removed from the spectacles 500.

Generally, there has been an attachment used for fixing a magnifying glass to a pair of glasses as, for example, in Japanese Patent Application Publication No. 2003-295128. The attachment includes a clip griping a part of the glasses and a bar to which a magnifying glass is attached, which are connected to each other by a two-step link.

The attachment of magnifying lens disclosed in the above related art can be moved outside of the user's view by moving the link without removing the clip and the arm from the spectacles. If, however, the display body 40 is attached to the spectacles with the attachment, the arm extending from the clip to the left and right sides may cut across the user's view when the user looks away from the image information displayed on the display section 42 of the display body 40.

SUMMARY

To solve the above problems, a first aspect of the present invention provides a microdisplay attached to either lens of spectacles. The microdisplay includes: a display body; a vertical extending section attached to approximately the center of the display body in the horizontal direction that extend to in the vertical direction; and a horizontal extending section of which one end is connected to a nose bridge of the spectacles and the other end is connected to end pieces of the spectacles that slidably holds the vertical extending section in the horizontal direction. Thereby the microdisplay fixed to the spectacles will not relatively disturb the user's view in comparison with the case that the vertical extending section arranged on the side of the display body.

The microdisplay may further include a joint section that rotates the display body in at least the vertical plane. Thereby the microdisplay can be moved outside of the user's view without removing the microdisplay from the spectacles.

In the microdisplay, the vertical extending section may include a first support member attached to the display body that supports, the display body, a second support member attached to the horizontal extending section that slidably supports the first support section in the vertical direction and a fixing section that fixes the first support member to the second support member in the vertical direction. Thereby the display body can be moved to a desired position in the vertical direction without removing the microdisplay from the spectacles.

Here, all necessary features of the present invention are not listed in the summary of the invention. The sub-combinations of the features may become the invention.

DESCRIPTION OF EXEMPLARY EMBODIMENTS

Hereinafter, the present invention will now be described through preferred embodiments. The embodiments do not limit the invention according to claims and all combinations of the features described in the embodiments are not necessarily essential to means for solving the problems of the invention.

Figure 1:
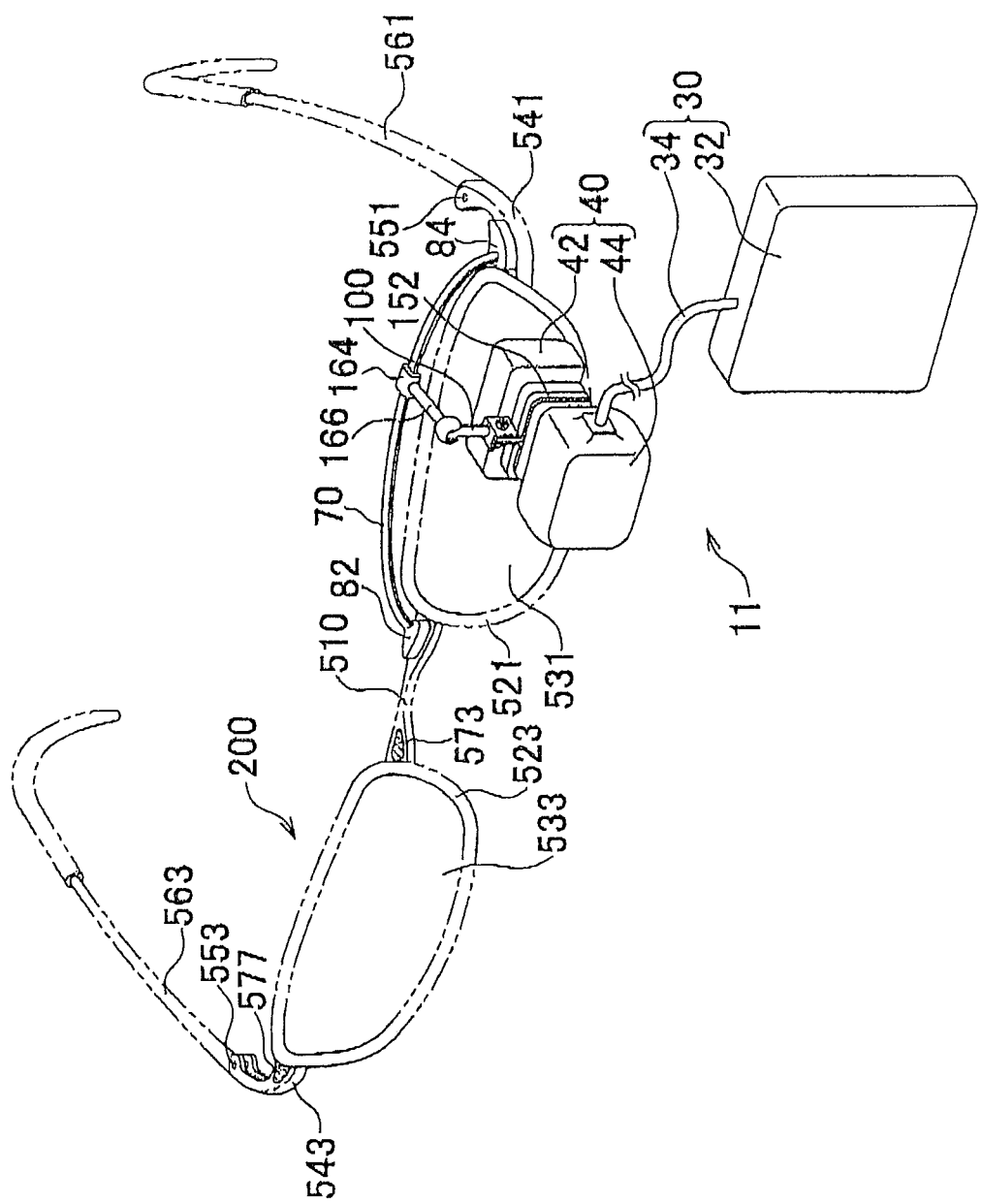
FIG. 1 is a perspective view showing a microdisplay 11 according to a first embodiment attached to a spectacles 500.
Figure 2:
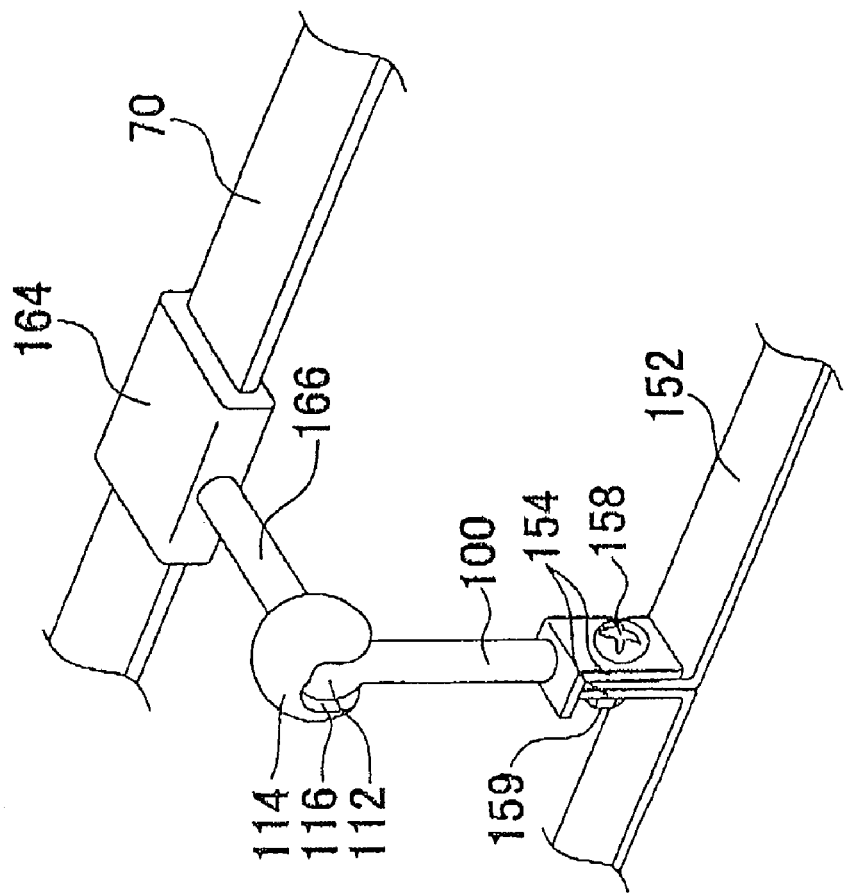
FIG. 2 is an enlarged view showing a portion at which a display body 40 is connected to a horizontal extending section 70 in the microdisplay 11.
Figure 6:
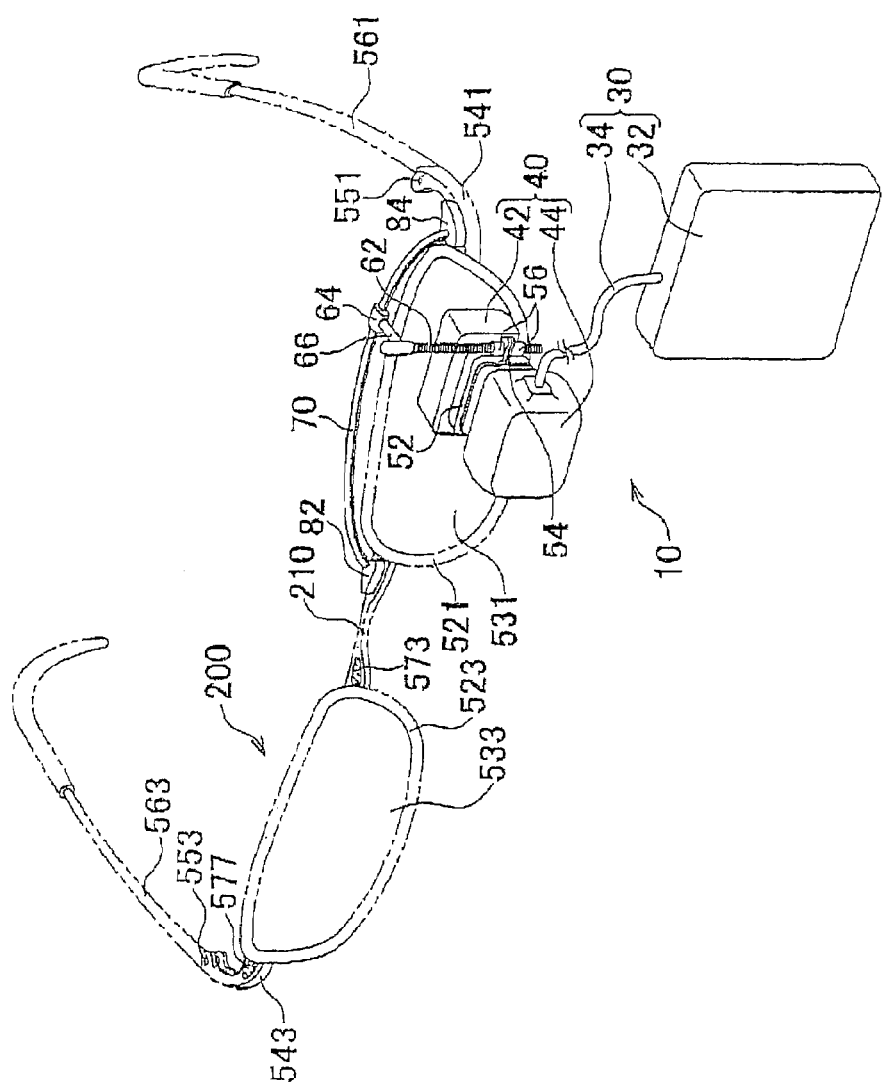
FIG. 6 is a perspective view showing a known microdisplay 10 attached to spectacles 500.
Figure 7:
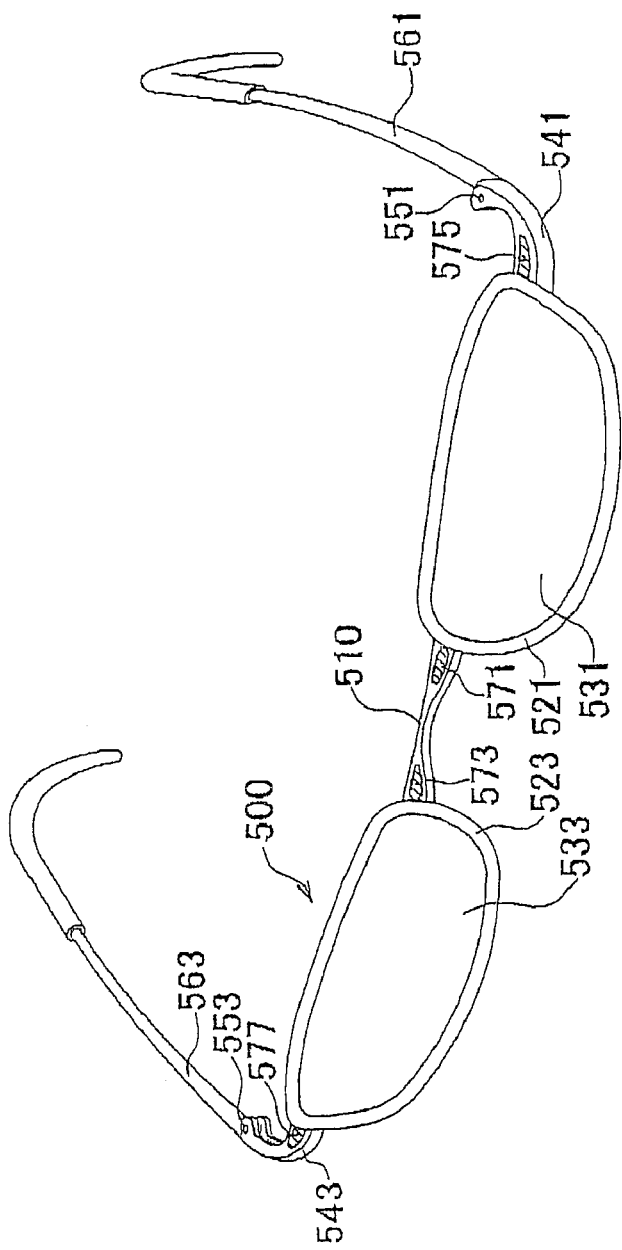
FIG. 7 is a perspective view showing the spectacles 500 used with the microdisplay 10.

FIG. 1 is a perspective view showing a microdisplay 11 according to a first embodiment attached to the spectacles 500. FIG. 2 is an enlarged view showing a portion at which the display body 40 is connected to the horizontal extending section 70 in the microdisplay 11. The components with the same reference numerals shown in FIGS. 1 and 2 have the same configuration as the components of the microdisplay 10 shown in FIGS. 6 and 7, so that the description thereof is omitted. In the microdisplay 11, the fixture 152 is attached to the outside of a main body 44. An edge 154 of the fixture 152 is located on approximately the center of the upper surface of the main body 44 in the horizontal direction, and protrudes thereover. The edge 154 having a horizontal through-hole, as shown in FIGS. 1 and 2, is connected to one end of the vertical extending section 100 and is fixed with a screw 158 and a nut 159.

The vertical extending section 100, as shown in FIGS. 1 and 2, is attached to the edge 154 of the fixture 152 on approximately the center of the display body 40 in the horizontal direction, and extended to the vertical direction. The vertical extending section 100 also has a ball 112 on the other end thereon, which is opposite to the end attached to the edge 154. The ball 112 is rotatably fitted into a support 114 formed on the front edge of an arm 166 extending from a sliding member 164 to form a ball joint. These ball 112 and support 114 are examples of the embodiment of the joint of the present invention. The sliding member 164 has the same shape of the sliding member 64 of the mocrodisplay 10 described above, includes the through-hole through which the horizontal extending section 70 is penetrated and is slidably held by the horizontal extending section 70.

In the microdisplay 11, the display body 40 is connected to the horizontal extending section 70 via the vertical extending section 100 which is attached to substantially the center of the display body 40 in the horizontal direction and extended to the vertical direction. Therefore, it can not relatively disturb the user's view in comparison with the case that the vertical extending section 100 is placed on the side of the display body 40 while the microdisplay 11 is attached to the lens 531 of the spectacles as shown in FIG. 1, for example. Additionally, in the above described state, the display body 40 can rotate vertically and along the surface of the ball 112 in a plane vertical to the lens 531, in a plane parallel to the lens 531 and in a level plane. Further, as shown in FIG. 2, a groove 116 is formed in the support 114. Thereby the display body 40 can be moved vertically in the plane vertical to the lens 531 to a position outside of the user's view without removing the microdisplay 11 from the spectacles 500.

Figure 3:
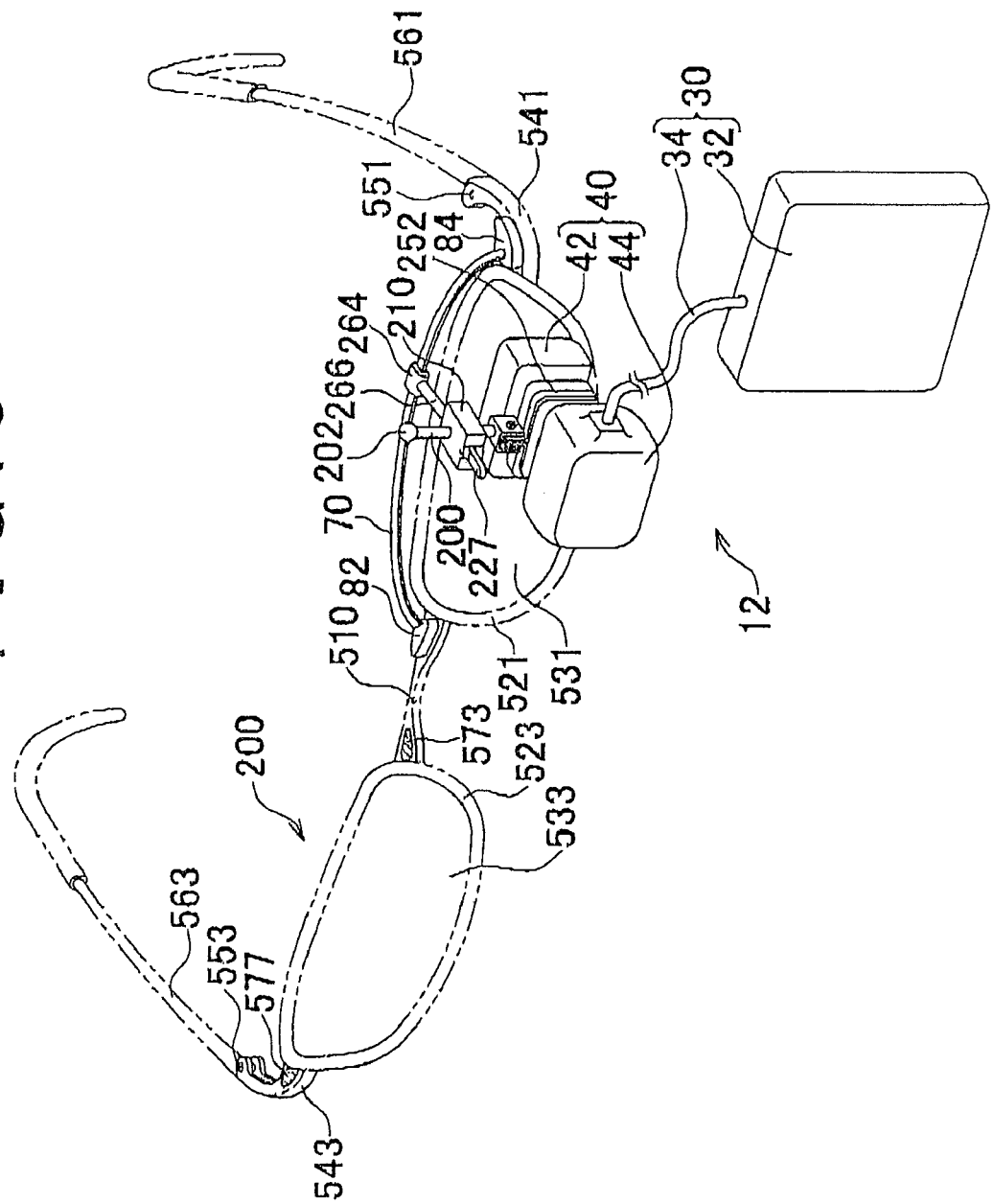
FIG. 3 is a perspective view showing the microdisplay 12 according to a second embodiment of the present invention attached to the spectacle 500.
Figure 4:
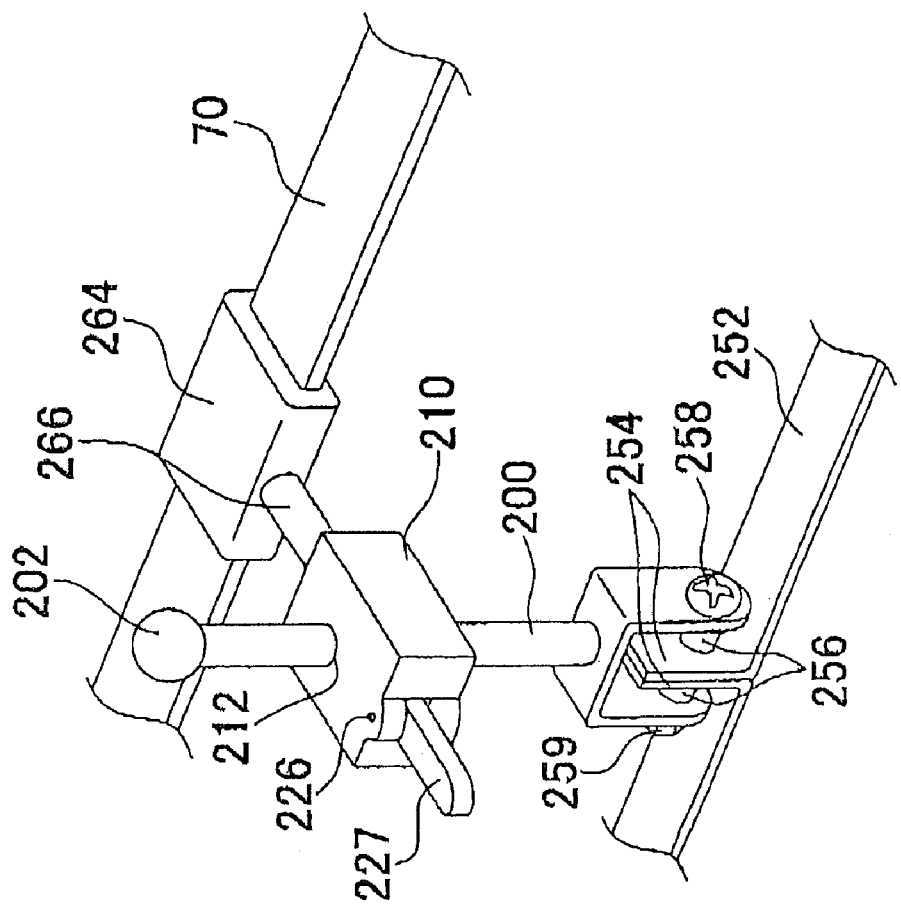
FIG. 4 is an enlarged view showing a portion area at which the display body 40 is connected to the horizontal extending section 70 in the microdisplay 12.

FIG. 3 is a perspective view showing the microdisplay 12 according to a second embodiment of the present invention attached to the spectacle 500. FIG. 4 is an enlarged view showing a portion at which the display body 40 is connected to the horizontal extending section 70 in the microdisplay 12. The components with the same reference numerals shown in FIGS. 3 and 4 have the same configuration as the components of the microdisplay 10 shown in FIGS. 6 and 7, so that the description thereof is omitted. The following further describes another configuration of the microdisplay 12, which is attached to the lens 531 of the spectacles 500 as shown in FIG. 3.

In the microdisplay 12, a fixture 252 is attached to the outside of a main body 44. The edge 254 of the fixture 252 is located on approximately the center of the upper surface of the main body 44 in the horizontal direction, and protrudes thereover. Additionally, the edge 254 has a screw section 256 through which a threaded hole penetrating in the horizontal direction is formed, is connected to one end of a first support member 200 and is fixed with a screw 258 and a nut 259 as shown in FIGS. 3 and 4.

The first support member 200, as shown in FIGS. 3 and 4, is attached to the edge 254 of the fixture 252 approximately on the horizontal center of the display body 40, and extended to the vertical direction. The second support member 210 is connected to the sliding member 264 via an arm 266. A second support member 210 has a through-hole 212 whose openings are in the both top and bottom surfaces, which have almost the same cross sectional area as that of the first support member 200. As shown in FIGS. 3 and 4, the first support member 200 penetrates through the through-hole 212 and is slidably held by the second support member 210 in the vertical direction. The sliding member 264 has the same shape of the sliding member 64 of the mocrodisplay 10 and the sliding member 164 of the mocrodisplay 11 described above, includes the through-hole through which the horizontal extending section 70 is penetrated and is slidably held by the horizontal extending section 70.

Figure 5:
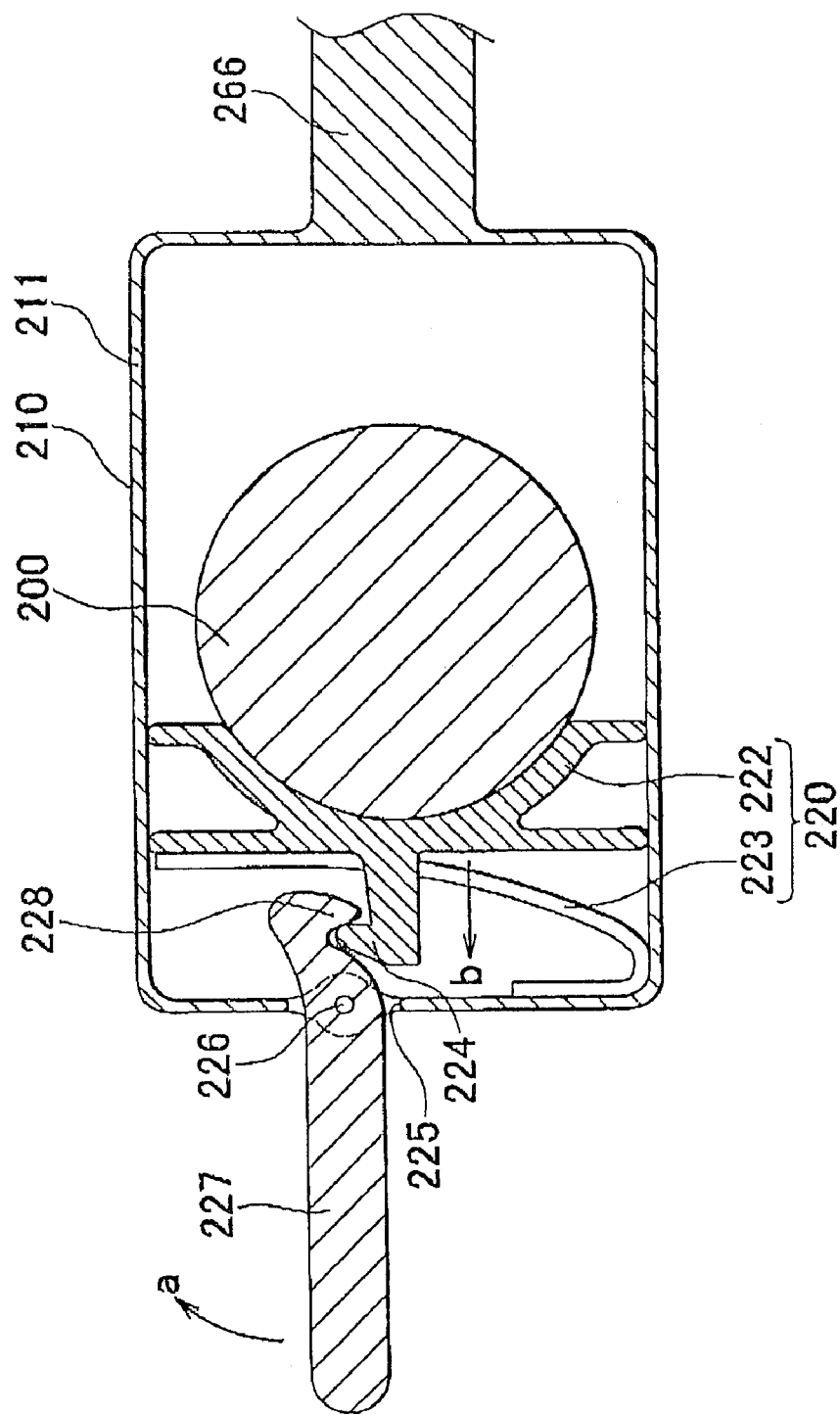
FIG. 5 is a cross-sectional view showing the inner structure of a second support member 210.

FIG. 5 is a cross-sectional view showing the inner structure of the second support member 210. As shown in FIG. 5, the first support member 200 penetrates through the center of an outer shell 211 of the second support member 210 in the vertical direction. Then, a fixing section 220 including an abutting member 222 and a leaf spring 223 is placed in the inner side of the outer shell 211 of the second support member 210. One end of the leaf spring 223 is abutted with the one surface of the abutting member 222 and applies bias power to the abutting member 222 in such direction that the abutting member 222 abuts with the first support member 200. Therefore, while the side surface of the first support member 200 is abutted with the abutting member 222, the first support member 200 is fixed to the second support member 210 so as not to move in the vertical direction.

Meanwhile, as shown in FIG. 5, a hook 224 is provided on a surface abutting with the leaf spring 223 on the abutting member 222. The second support member 210 has a lever 227 protruding outwardly from the opening 225 on the outer shell 211, and a rotating shaft 226 vertically put over the opening 225. Both vertical ends of the rotating shaft 226 are fixed to the outer shell 211. The lever 227 rotates around the rotating shaft 226. Additionally, a hook 228 is formed opposed to the rotating shaft 228 of the lever 227, i.e. in the inner side of the outer shell 211 of the second support member 210 of the lever 227.

Here, when the lever 227 is moved to the direction indicated by the arrow "a" shown in FIG. 5, the hook 228 hitches the hook 224 of the abutting member 222 to move the abutting member 222 to the direction indicated by the arrow "b" shown in FIG. 5. Thereby the abutting member 222 removes from the side surface of the first support member 200, so that the first support member 200 can freely move with respect to the second support member 210 in the vertical direction. Meanwhile, when the lever 227 moved in the direction indicated by the arrow "a" shown in FIG. 5 is released, the lever 227 is immediately returned to the position shown in FIG. 5, and the abutting member 222 is abutted with the side surface of the first support member 200. Therefore, the first support member 200 is fixed to the second support member 210 so as not to move in the vertical direction.

For example, if the user wearing the spectacles 500 with the microdisplay 12 wants to move the display body 40 in the vertical direction, the user can move the display body 40 supported by the first support member 200 to a desired position in the vertical direction by operating the above lever 227. Therefore, the display body 40 can be moved to the desired position in the vertical direction without removing the microdisplay 12 from the spectacles 500. In addition, the first support member 200 has a stopper 202 on one end which is opposite to the other end attached to the edge 254. Therefore, if the user fails to operate the lever 227 and then the second support member 210 is moved up to the upper end of the first support member 200, the second support member 210 is abutted with the stopper 202 and stopped, so that the display body 40 cannot fall out by dropping out the second support member 210 from the first support member.

While the present invention has been described with the embodiment, the technical scope of the invention not limited to the above described embodiment. It is apparent to persons skilled in the art that various alternations and improvements can be added to the above-described embodiment. It is apparent to persons skilled in the art that various alternations and improvements can be added to the above-described embodiment.

What is claimed is:

1. A microdisplay attached to either lens of spectacles, comprising:
   a display body;
      a vertical extending section attached to approximately the center of the display body in the horizontal direction that extend to in the vertical direction;
      a horizontal extending section of which one end is connected to a nose bridge of the spectacles and the other end is connected to end pieces of the spectacles that slidably holds the vertical extending section in the horizontal direction.

2. The microdisplay as set forth in claim 1 further comprising a joint section that rotates the display body in at least the vertical plane.

3. The microdisplay as set forth in claim 2, wherein the vertical extending section includes a first support member attached to the display body that supports the display body, a second support member attached to the horizontal extending section that slidably supports the first support section in the vertical direction and a fixing section that fixes the first support member to the second support member in the vertical direction.

4. The microdisplay as set forth in claim 1, wherein the vertical extending section includes a first support member attached to the display body that supports the display body, a second support member attached to the horizontal extending section that slidably supports the first support section in the vertical direction and a fixing section that fixes the first support member to the second support member in the vertical direction.

* * * * *